United States Patent [19]

Kim

[11] Patent Number: 5,140,446
[45] Date of Patent: Aug. 18, 1992

[54] PAPER JAM DETECTION METHOD

[75] Inventor: Jae-Meong Kim, Suwon-city, Rep. of Korea

[73] Assignee: Samsung Electronics Co., Ltd., Suweon, Rep. of Korea

[21] Appl. No.: 420,932

[22] Filed: Oct. 13, 1989

[30] Foreign Application Priority Data

Feb. 28, 1989 [KR] Rep. of Korea ................ 1989-2474

[51] Int. Cl.$^5$ .............................................. H04N 1/31
[52] U.S. Cl. .................................... 358/498; 358/204
[58] Field of Search ............... 355/308, 309, 310, 498, 355/304

[56] References Cited

U.S. PATENT DOCUMENTS 4,310,859  1/1982  Takahashi ........................ 358/304

FOREIGN PATENT DOCUMENTS 0159667 12/1980 Japan ................................. 358/304
0046360  4/1981 Japan ................................. 358/304
0004265  1/1984 Japan ................................. 358/304
0229469 11/1985 Japan ................................. 358/304

Primary Examiner—Edward L. Coles, Sr.
Attorney, Agent, or Firm—Robert E. Bushnell

[57] ABSTRACT

A paper jam is detected by detecting the operating time of cutter, using the difference between the operating time in case there is recording paper and the operating time in case there is no recording paper when the cutter carries out its cutting operation.

8 Claims, 4 Drawing Sheets

PAPER JAM DETECTION METHOD

BACKGROUND OF THE INVENTION

The present invention relates to a paper loading system which transfers recording paper of a facsimile. In particular, it relates to a method by which to detect a phenomenon in which the recording paper fails to run out, i.e. discharge from said facsimile.

Generally speaking, the facsimile is a device which dissolves an original picture by scanning into picture elements and then changes them into electric signals and transmits those signals to the other party through a medium of transmission and, on the other hand, demodulates those electric signals which are received through the medium of transmission into picture elements and then combines those elements and records them on the recording paper.

In the facsimile, the paper loading system which transfers the recording paper provided to record a received picture is formed as illustrated in FIG. 1. Paper jam means a phenomenon in which the recording paper 10 in the loading system as shown in FIG. 1 fails to run out over the cover 11. It happens mainly from being caught by the cutter 12 or by its peripheral appliances. As to a circuit provided to drive the paper loading system as shown in FIG. 1, it is constructed as illustrated in FIG. 2 and operates in the following manner.

A central processing unit (hereinafter referred to as CPU) 20 drives a DC motor 22 and a step motor 23 through an input/output circuit 21. In addition, it receives output of two photocouplers 14, 15 and senses the remainder of recording paper and detects a paper jam. The input/output circuit 21 drives the DC motor 22 and the step motor 23 under the control of said CPU 20. And, it transmits the output of said two photocouplers 14, 15 to said CPU 20 and, when it drives said DC motor 22, transmits the output of a micro-switch SW which is switch operated by the cutter 12 to said CPU 20. The step motor 23 transfers the recording paper 10 toward the cutter 12 by giving a turn to a recording paper transfer roller 13 at regular angles when the original picture is received, and the DC motor 22 operates the cutter 12 to cut the recording paper. The photocoupler 14 detects if the recording paper is transferred when the original picture is received. The photocoupler 15 detects if there is a remainder of the recording paper. In the drawing, 16 is a printer head and 17 is a paper feeding roller.

A conventional method which has been heretofore used to detect the paper jam caused in the paper loading system in FIG. 1 which is driven by the circuit of FIG. 2 is carried out according to a flowchart of FIG. 3. Now, a description of FIG. 3 will be made as follows.

When the original picture is received, the CPU 20 drives the step motor 23 through the input/output circuit 21 and transfers the recording paper and, on the other hand, receives the output of photocoupler 14 used as a jam detection sensor through the input/output circuit 21 (step 30). After said step 30 is over, the CPU 20 checks if the output of said photocoupler 14 is in the high logic condition and determines whether there is recording paper (step 31). That is, it checks whether the recording paper transfer operation has come to an end. In the event that no recording paper exists in the high logic condition of said photocoupler 14 output at said step 31, the CPU 20 checks if page reception time is over and, when said page reception time is not over, returns to the previous step (step 32). Step 33 displays the occurrence of paper jam, and step 34 has the cutter 12 cut the recording paper. However, such a method as described hereinabove requires a photocoupler 14 used as a paper jam detection sensor. Thus, it involves a problem in that a design for circuits is made complicated by the arrangement of a printer keyboard and connecting wires.

Consequently, the object of the present invention is to provide a paper jam detection method in which a design for the circuit can be simplified by detecting the present condition of the paper without a jam detection sensor, in a facsimile employing rolled recording paper.

BRIEF DESCRIPTION OF THE DRAWINGS

While the invention has been particularly shown and described with reference to a preferred embodiment, it will be understood by those skilled in the art that modifications in detail may be made without departing from the spirit and scope of the invention.

DETAILED DESCRIPTION OF THE INVENTION

Figure 4:
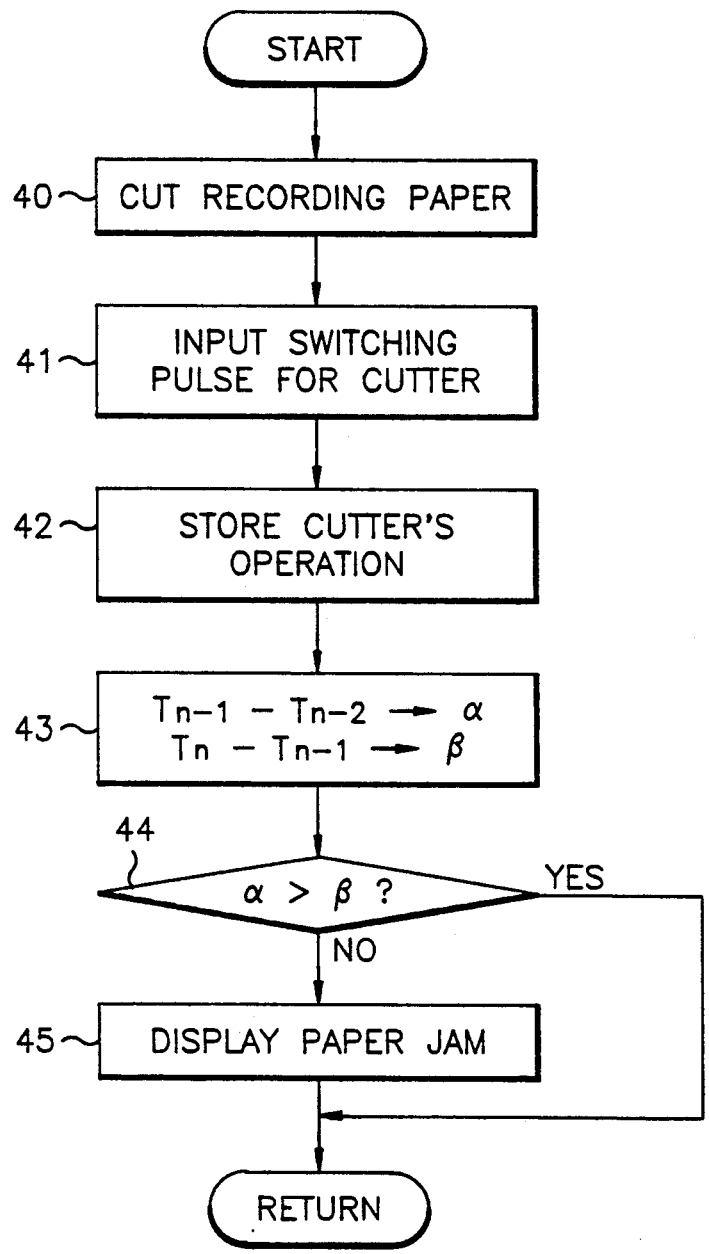
FIG. 4 is a flowchart of the present invention.

FIG. 4 is a flowchart of the method according to the present invention. The method inputs the operating time of a cutter 12, which cuts the recording paper when the original picture reception or page reception comes to an end, and computes the deviation of measured operating time which is a difference from the existing cutter's normal operating time and then checks if it is greater than the deviation of standard operating time which is the maximum fluctuating time of existing cutter's normal operating times. Then, the method recognizes the occurrence of paper jam in the event that the deviation of measured operating time is greater than the deviation of standard operating time and displays the occurrence of paper jam. Thereafter, the method recognizes that the recording paper has run out in a normal way in the event that the deviation of measured operating time is smaller than or equal to the deviation of standard operating time.

Figure 2:
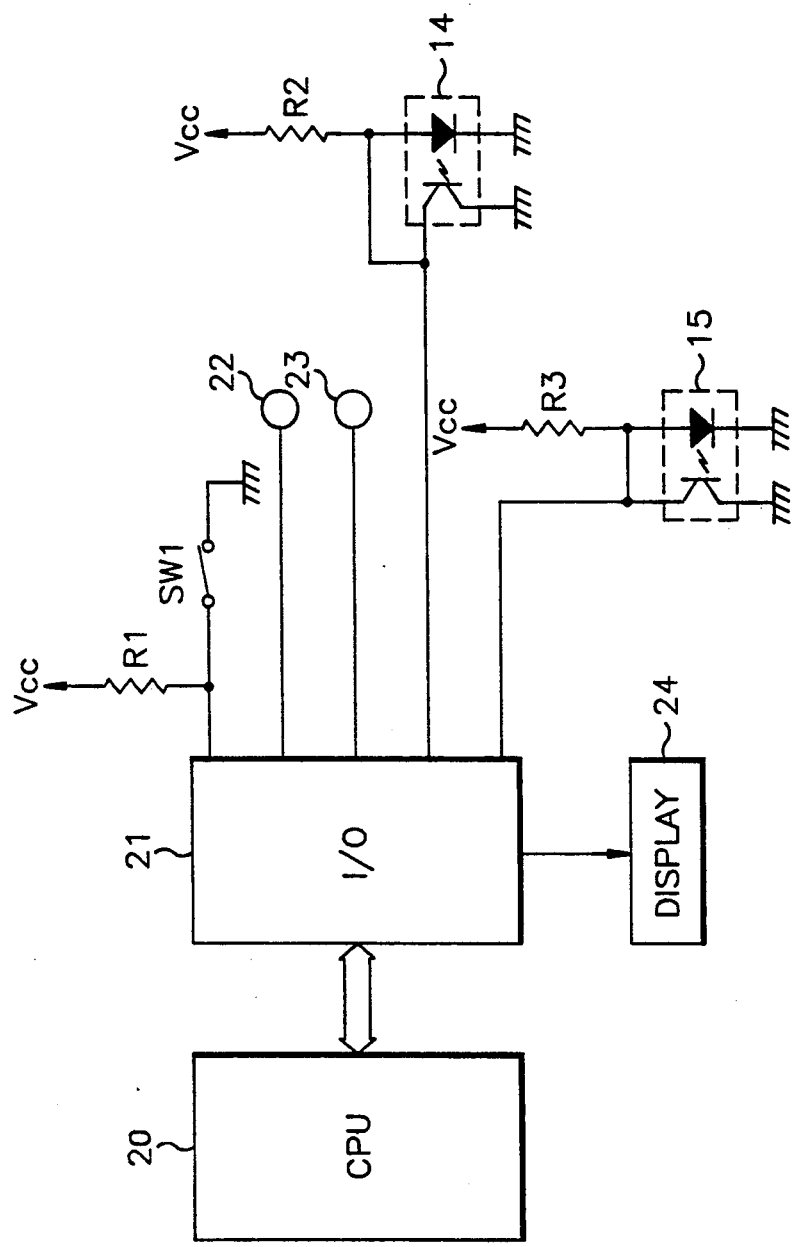
FIG. 2 is a drive circuit diagram of FIG. 1.
Figure 3:
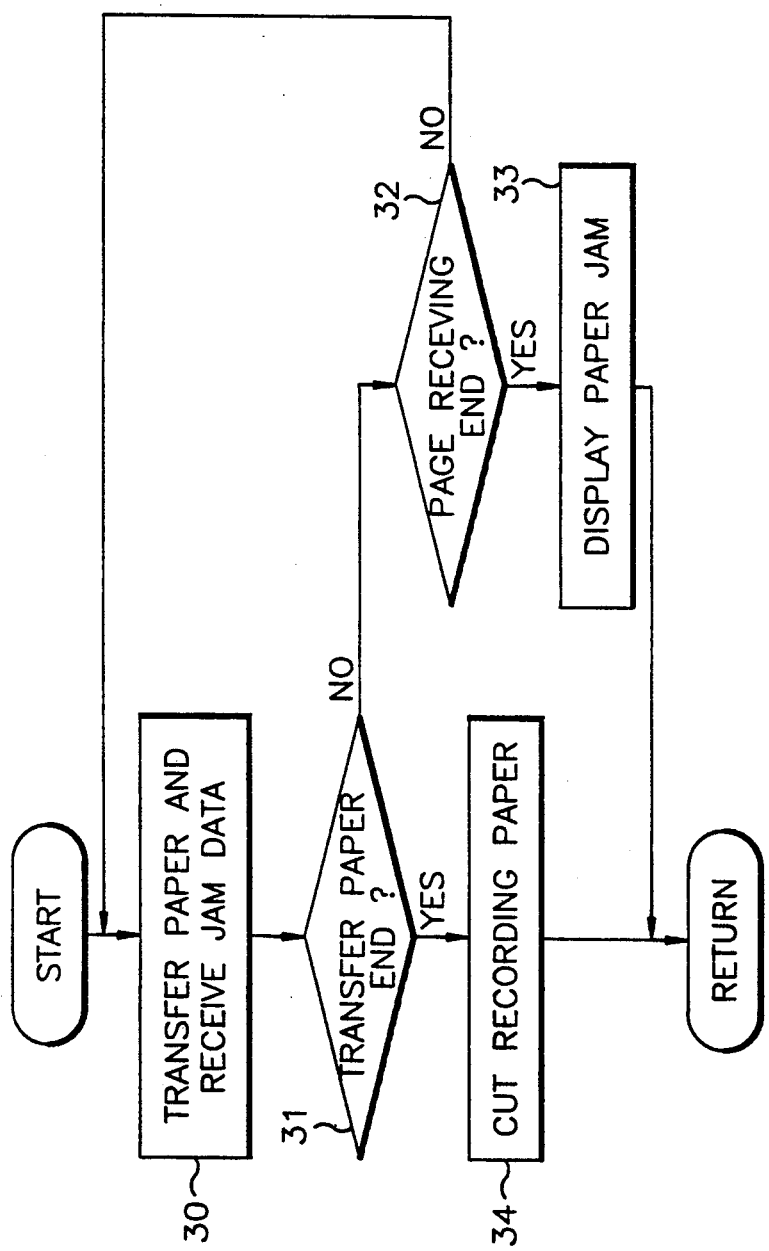
FIG. 3 is a flowchart of prior art.

Hereinafter, FIG. 4, which is a flowchart of the present invention, will be described in detail. The flowchart is a program executed by the CPU 20 in FIG. 2. It is the program performed in case the original picture reception comes to an end when it is received or in case the page reception comes to an end while the original picture is received.

When the original picture reception or page reception comes to an end, the CPU 20 drives the DC motor 22 through the input/output circuit 21. At this time, the DC motor 22 turns on and operates the cutter 12 in FIG. 2 to cut the recording paper (step 40). After this step 40 is over, the CPU 20 inputs the switching pulse of a micro-switch SW1 through the input/output circuit 21 (step 41) and computes the operating time of the cutter 12 with a width of said switching pulse and then stores the computed present cutter's operating time $T_n$ in the storage where cutter's operating time before said one is stored in its internal memory (step 42). After said step 42 is over, the CPU 20 reads out the cutter's last operating time $T_{n-1}$ and operating time $T_{n-2}$ before the last which are stored in its internal memory and then computes the deviation α of standard operating time by subtracting the operating time before the last $T_{n-2}$ from the last operating time $T_{n-1}$ and again computes the deviation β of measured operating time by subtracting the last operating time $T_{n-1}$ from the present operating time Tn (step 43).

After the step 43 is over, the CPU 20 determines whether a paper jam occurred by checking if the deviation α of said standard operating time is less than or equal to the deviation β of measured operating time (step 44). In the event that the deviation α of the standard operating time is less than or equal to the deviation β of the measured operating time at the step 44, the CPU 20 recognizes that a paper jam occurred and outputs a paper jam message to a display device 24 through the input/output circuit 21 and then returns to the main routine (step 45).

At this time, the display device 24 displays the paper jam message supplied from the CPU 20 through said input/output circuit 21. In the event that the deviation α of standard operating time is greater than the deviation β of measured operating time at the step 44, the CPU 20 recognizes that it operated in a normal way and returns to the main routine.

Figure 1:
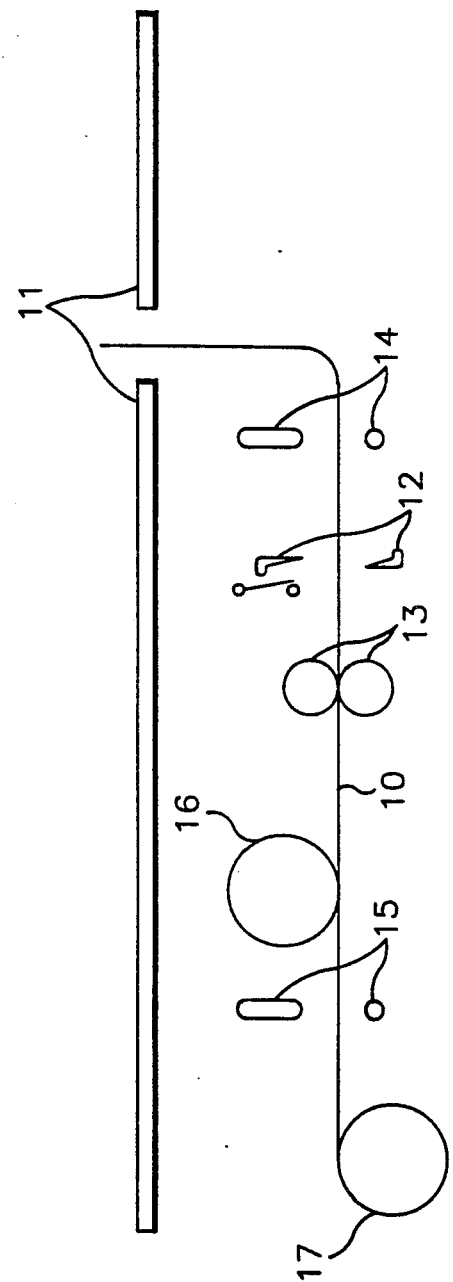
FIG. 1 is a schematically cross-sectional view of a facsimile recording paper transfer system.

Making an additional description of the method in which the micro-switch SW1 generates a switching pulse, it is as follows: While the cutter 12 comes up and stands at its original position when it goes down in FIG. 1, the micro-switch SW1 is "on" and outputs reference potential GND to the input/output circuit 21 and so it generates a switching pulse which is in the low logic condition.

Giving an explanation of the instance where the deviation α of standard operating time is less than or equal to the deviation β of measured operating time and the instance where the deviation α of standard operating time is greater than the deviation β of measured operating time, it is as follows. When there is recording paper on the cutter 12 in FIG. 1, the operation torque of cutter 12 is consumed by the recording paper and so the operating time grows longer than when there is no recording paper thereon. Thus, the deviation α of the standard operating time is the maximum fluctuating time of the cutter's normal operating times and the deviation β of the measured operating time is a time difference between the cutter's present operating time and its normal operating time.

As described hereinbefore, the present invention is advantageous in that it detects a paper jam without a separate paper jam detection sensor by checking a time difference between the cutter's present operating time and its normal operating time and thereby simplifies a design for circuits by reducing parts.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A method for detecting a paper jam in a facsimile having a cutter, comprising the steps of:
   receiving a representation of operating time of a cutter which cuts a recording paper when either one of an original picture reception and page reception comes to an end;
   computing a deviation of a measured operating time by determining a time difference from a normal operating time of the cutter;
   determining whether the deviation of the measured operating time is greater than a deviation of a standard operating time corresponding to maximum fluctuating time of said normal operating of the cutter;
   recognizing an occurrence of a paper jam in an event that the deviation of the measured operating time is greater than the deviation of the standard operating time by displaying an indication of the occurrence of the paper jam; and
   recognizing that the recording paper has been discharged in the event that the deviation of the measured operating time is less than or equal to the deviation of the standard operating time in the aforesaid process.

2. A process for detecting a paper jam in a facsimile, comprising:
   beginning the process by severing lengths from a roll of continuous paper with a cutter;
   inputting switching pulses having a width dependent on position of the cutter;
   determining operating times of the cutter in dependence upon said widths of said switching pulses;
   storing said operating times;
   reading previously stored said operating times;
   obtaining a standard deviation of said operating times by taking the difference between a first one of said operating times and a second one of said operating times occurring earlier than said first one of said operating times;
   obtaining a current deviation of said operating times by taking the difference between said second one of said operating and a third one of said operating times occurring after said second one of said operating times;
   determining whether the current deviation of said operating times is greater than the standard deviation of said operating times; and if the current deviation of said operating times is greater than the standard deviation of said operating times, displaying a message.

3. The process for detecting a paper jam in a facsimile of claim 2, further comprising:
   if the current deviation of said operating times is less than or equal to the standard deviation of said operating times, returning to the beginning of said process.

4. The process for detecting a paper jam in a facsimile of claim 2, whereby said message indicates a failure to properly discharge said paper.

5. A paper loading system, comprising:
   means for severing lengths of paper;
   a central processing unit;
   means for operating the severing means;
   means for displaying data;
   a switch;
   whereby said central processing unit performs a process comprised of:
      beginning said process by driving the means for operating the severing means to serve lengths of paper;
      receiving switching pulses from the switch, the switching pulses have a width dependant on position of the means for severing lengths of paper;

determining operating times of the severing means in dependence upon said widths of said switching pulses;

storing said operating times;

previously stored said operating times;

obtaining a standard deviation of said operating times by taking the difference between a first one of said operating times and a second one of said operating times earlier than said first one of said operating times;

obtaining a current deviation of said operating times by taking the difference between said second one of said operating times and a third one of said operating times occurring after said second one of said operating times;

determining whether the current deviation of said operating times is greater than the standard deviation of said operating times; and if the current deviation of said operating times is greater than the standard deviation of said operating times, providing a paper jam message to the means for displaying data; whereby said means for displaying data displays the paper jam message.

6. The paper loading system of claim 5, wherein said central processing unit:

if the current deviation of operating times is less than or equal to the standard deviation of said operating times, returns to the beginning of said process.

7. The paper loading system of claim 5, further comprising:

rolling means for feeding and guiding paper through said severing means;

a printer head disposed in proximity to said rolling means; and means for turning the rolling means and thereby feeding paper through said severing means.

8. The paper loading system of claim 5, whereby said paper loading system transfers recording paper of a facsimile.

* * * * *

UNITED STATES PATENT AND TRADEMARK OFFICE
CERTIFICATE OF CORRECTION

PATENT NO. : 5,140,446
DATED : August 18, 1992
INVENTOR(S) : Jae- Myeong Kim

It is certified that error appears in the above-indentified patent and that said Letters Patent is hereby corrected as shown below:

IN THE ABSTRACT [57]

Line 2      After "of" insert --a--:

Signed and Sealed this

First Day of October, 1996

Attest:

BRUCE LEHMAN

*Attesting Officer*     *Commissioner of Patents and Trademarks*